(12) United States Patent
Congard et al.

(10) Patent No.: US 7,777,947 B2
(45) Date of Patent: Aug. 17, 2010

(54) PROJECTION SCREEN, IN PARTICULAR FOR VIDEO PROJECTION REDUCING THE MOIRÉ EFFECT

(75) Inventors: Patrice Congard, Paris (FR); Yves Trelohan, Orvault (FR)

(73) Assignee: Screen Research, La Chapelle sur Erdre (FR)

( * ) Notice: Subject to any disclaimer, the term of this patent is extended or adjusted under 35 U.S.C. 154(b) by 852 days.

(21) Appl. No.: 10/570,135

(22) PCT Filed: Sep. 2, 2004
(Under 37 CFR 1.47)

(86) PCT No.: PCT/FR2004/002241

§ 371 (c)(1),
(2), (4) Date: Jan. 3, 2007

(87) PCT Pub. No.: WO2005/024506

PCT Pub. Date: Mar. 17, 2005

(65) Prior Publication Data

US 2008/0211972 A1  Sep. 4, 2008

(30) Foreign Application Priority Data

Sep. 2, 2003  (FR) .................................. 03 10375

(51) Int. Cl.
*G03B 21/56* (2006.01)

(52) U.S. Cl. ..................................................... 359/445
(58) Field of Classification Search ................. 359/443, 359/445, 461
See application file for complete search history.

(56) References Cited

U.S. PATENT DOCUMENTS

| 1,846,357 | A |   | 2/1932  | Raven          |         |
|-----------|---|---|---------|----------------|---------|
| 1,877,941 | A |   | 9/1932  | Morris         |         |
| 1,878,075 | A |   | 9/1932  | Walker         |         |
| 1,878,570 | A | * | 9/1932  | Abbott         | 139/420 R |
| 1,959,434 | A |   | 5/1934  | Major et al.   |         |
| 1,985,460 | A | * | 12/1934 | Raven          | 359/445 |
| 3,692,384 | A | * | 9/1972  | Kimura et al.  | 359/445 |
| 2007/0086088 | A1 | * | 4/2007 | Astill       | 359/443 |

FOREIGN PATENT DOCUMENTS

| CH | 206 978 A   | 9/1939 |
| EP | 0 438 161 A2 | 7/1991 |
| JP | 3-130746 A  | 6/1991 |

* cited by examiner

*Primary Examiner*—Christopher Mahoney
(74) *Attorney, Agent, or Firm*—Browdy and Neimark, PLLC

(57) ABSTRACT

A projection screen comprises a film having a projection side and provided with a number of passages adapted for permitting emitted sound waves to pass through said film. The projection screen is characterized in that these passages are arranged in such a manner that, if alignments can be detected, at least the principal ones have an angle that is not zero with regard to the vertical and horizontal edges of the screen.

31 Claims, 3 Drawing Sheets

Face A

Face B

PROJECTION SCREEN, IN PARTICULAR FOR VIDEO PROJECTION REDUCING THE MOIRÉ EFFECT

FIELD OF THE INVENTION

The invention, relates to a projection screen, intended in particular for video applications. To be more precise, it is directed to a screen that is permeable to sound waves.

BACKGROUND OF THE INVENTION

The advantages of screens that are permeable to sound waves are known, in that they enable sound sources to be placed behind the screen, thereby achieving a perceptible cohesion between the projected image and the sound (whether the image is front-projected or back-projected).

Those advantages are described in particular in the document FR 2810122 (CONGARD) and its counterparts EP-1162499 and U.S. Pat. No. 6,552,847.

Disposing the sound sources, in practice loudspeakers, behind a screen in this way is routine in movie theaters, where the screen is conventionally perforated with small holes intended to enable sound to pass through.

In video applications, and in domestic applications in particular, the visibility of the holes is often increased by the proximity of the spectators to the screen. The size and spacing of the holes are conventionally determined by the tools used to produce them, independently of the size of the screen.

Certain manufacturers have recently developed tools for reducing the size and spacing of the perforations whilst preserving a substantially constant ratio of the perforated area to the total area of the screen.

Screens using "woven" technology are also used for these applications.

Most recent video projectors are of the fixed pixel matrix type, using the digital light processor (DLP) or liquid crystal display (LCD) technique, for example. These fixed pixel projectors divide the video image into individual elements each of which is assigned a color and a value.

Projectors of the above kind project an image in which the rows of pixels are visible under certain conditions, especially if the image is viewed from a distance less than the recommended distance. The rows of pixels are in particular apparent as orthogonal alignments of the spaces between pixels parallel to the edges of the image.

In practice, it is found that the order of magnitude of the spacing between the holes in perforated video screens and the dimensions of a projected pixel are often similar. This results in visible interference between two periodic alignments, producing unwanted Moiré effects. Disposing the holes in a quincunx arrangement to reduce their visibility has already been proposed, but has achieved mixed results.

One makeshift solution is to adjust the distance between the projector and the projection screen, which varies the size of the projected image and therefore the size of the pixels, to find positions that generate the least Moiré effect. The results are mixed and do not guarantee that changing projector, for example for one with a higher definition and therefore a different pixel size, will not generate Moiré phenomena again.

These unwanted effects are also encountered with woven screens. When the structure of the canvas causes spaces or projected shadow effects to appear, the periodic alignment thereof generates the same unwanted Moiré effects as in perforated video screens.

Technologies developed with the object of obtaining a good compromise between image quality and permeability to sound waves that do not take account of the risk of the effects of resonance with the fixed matrix type technology (Moiré effects), have therefore proven to be incapable of achieving really good results.

In the situation where the flatness of the screen and/or its orthogonality to the projection axis are not perfect, which is the case in many installations in practice, the Moiré effects are much worse, whence even worse results.

For these reasons, screens that are permeable to sound are at present considered to be problematical in terms of compatibility with fixed pixel projectors, i.e. in practice with the great majority of projectors available, in particular for video projection.

BRIEF SUMMARY OF THE INVENTION

The object of the present invention is to propose a screen that is permeable to sound waves and that produces little or no visible optical interference when it is used with a fixed pixel projector, whilst at the same time being simple and inexpensive, and which can be stretched on a frame or of the roll-up type.

To this end the invention proposes a projection screen including a sheet having a projection face and provided with a plurality of passages adapted to allow sound waves to pass through the sheet, characterized in that the disposition of the passages of said plurality is such that, if alignments thereof can be detected, at least the main alignments have a non-zero inclination relative to the vertical and horizontal edges of the screen.

In the context of the invention, if there are any alignments, the main ones are those that are the most dense, i.e. that have the most passages per unit length.

It has become apparent that this absence of parallelism at the edges of the screen (and thus the existence of this inclination) cancels out or greatly reduces unwanted Moiré effects by reducing the risk of coincidence between the vertical and horizontal alignments of the projected image pixel structures and the projection screen passage or weft structure, since the sides of the screen are in practice parallel to the edges of the projected image.

The non-zero inclination is preferably greater than 5° or even greater than 10°, for example from 5° to 25°.

If the passages or, where applicable, the weft of the sheet form many alignments, the latter are inclined with the result that none of them, or as few of them as possible, are parallel to the vertical and horizontal edges of the screen.

The sheet is preferably made from a plurality of threads or by a method simulating the appearance of an array of threads (for example by molding plastics materials or by cutting out or "expanding" a sheet of solid material), but may also be made from a solid sheet perforated with small holes.

The risk of interference is further reduced if the plurality of passages or the weft features substantial geometry or orientation variations.

Because of these substantial geometry or orientation variations, when a light beam is directed toward the projection face, there are different physical interactions from one passage to another, which further reduces Moiré effects.

These variations may exist at the level of the passages considered individually, for example by virtue of the use of threads that are not smooth, for example bouclé threads (the contours of the passages are then irregular, including lengthwise) and/or by virtue of a treatment of the sheet, such as a dressing treatment (the contours of the passages are modified relative to their initial shape under the dressing). Thus the sheet is advantageously a crepe (woven or knitted, often using a bouclé and/or undulating thread, and being subjected to a dressing treatment).

There may also be variations from one passage to another.

Thus the variations may result from a difference of shape or orientation (in the plane of the sheet) from one passage to another: thus the passages may have an elongate shape, for example, with a greater dimension whose orientation varies from one hole to another. Accordingly, even if the locations of the passages form a periodic array, those of the passages that are strictly identical and therefore react identically to the incident light beams form an array that is much larger than that of the locations of the passages; without wishing to limit the invention by virtue of this interpretation, this would seem to be beneficial for reducing the risk of Moiré effects. These variations may be fluctuations, where appropriate periodic fluctuations.

These variations may also result from different orientations of the passages relative to the plane of the sheet, for example by virtue of the existence of surface patterns in one or more dimensions; one example of a multidimensional pattern is a lozenge or rectangle pattern, and one example of a unidimensional pattern is a linear array of undulations, for example a set of ribs. Accordingly, even if the passages are formed at locations forming a periodic array, the surface undulations mean that the passages react differently to light beams.

The sheet may advantageously be made of tweed, which yields passages (of different shapes) that are substantially aligned in more than one direction inclined to the plane of the sheet, for example with a chevron disposition (the woven threads follow a zig-zag path).

Another form of weaving is weaving individual threads in one direction and double threads in another direction, which combines the advantages of different passage shapes with those of surface undulations (lines in relief, in a direction inclined to each of the global directions of the woven threads). Note that this kind of weave is similar to that of denim jeans.

It might be emphasized that, in practice, the passages of a sheet of the invention are not very visible, if at all, to a spectator situated at the usual viewing distance and in the usual viewing direction (typically one and a half times the width of the screen, even in a domestic application, and thus with small screens).

The sheet may be produced from textile threads, but also from plastics material threads, for example polyester threads, advantageously bouclé polyester threads. The threads may be assembled by weaving or by any other process, for example knitting. The sheet may also be non-woven.

Preferred features of the invention, which may be used individually or in combination, include:
said sheet is solid but perforated;
said sheet is woven;
said sheet is woven with different numbers of warp threads and weft threads;
the spaces between the threads do not exceed 0.3 mm;
the projection face of the sheet has ribs inclined to the general directions of the warp and weft threads;
a coated polyvinyl chloride thread is used for weaving;
said sheet is of knitted thread;
the thread is a bouclé thread;
the thread is a polyester thread;
no weft is visible;
said surface is of crepe;
the sheet is woven and is of the satin type;
the sheet is woven and is of the tweed type;

the projection screen includes a second layer that is permeable to sound waves, substantially superposed on the first layer and placed behind said first layer relative to the light flux from the projector; and
a sound source is disposed behind said screen and a light source is disposed in front of it.

The invention also proposes an installation including a screen of the type cited above, a sound source disposed behind that screen and a light source disposed in front of it.

BRIEF DESCRIPTION OF DRAWING

Objects, features and advantages of the invention emerge from the following description, which is given by way of non-limiting illustrative example and with reference to the appended drawings, in which.

DETAILED DESCRIPTION OF THE DRAWINGS

Figure 1:
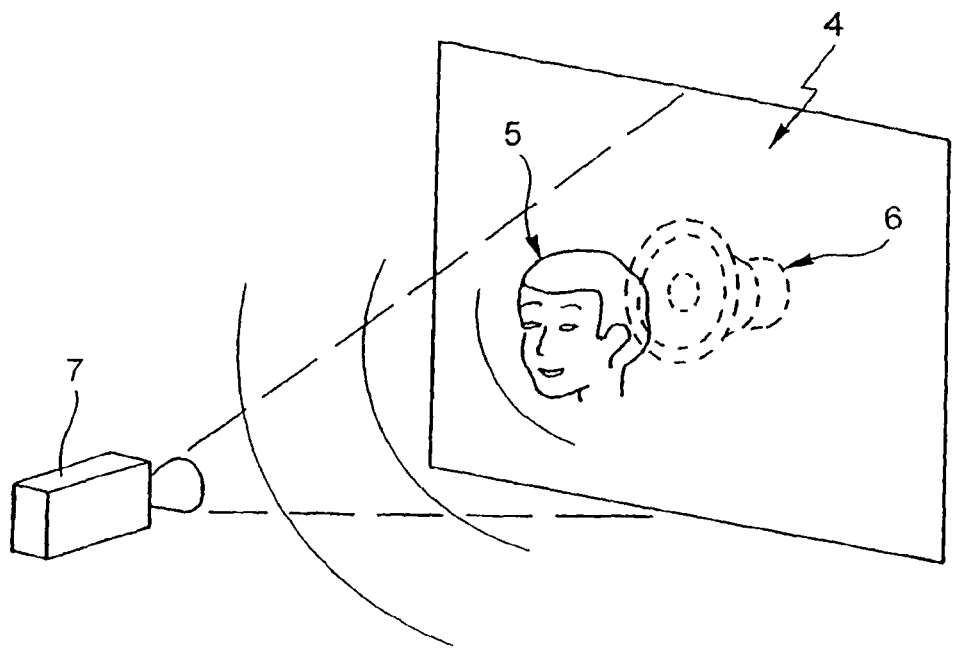
FIG. 1 is an overall perspective view of a projection screen that is permeable to sound placed in front of a sound source.

FIG. 1 is a diagram representing a projection screen 4 that is permeable to sound waves. An image 5 is projected onto the screen 4, representing a person speaking. A sound source 6 (represented in dashed outline) is placed behind the screen 4, substantially at its center. The sound source 6 reproduces a sound recording made of the person speaking when recording the image, usually in video. Here the image is front-projected (by a projector 7), but it could instead be back-projected.

The picture and sound recordings are synchronized.

This conventional arrangement is intended to reproduce sound and picture simultaneously and coherently. Placing the sound source at any other place would eliminate this cohesion, which would degrade the overall quality of the reproduction of the synchronized sound and picture recordings.

The disposition represented in FIG. 1 is conventional, and is encountered in most movie theaters, often enhanced by the presence of two further (right-hand and left-hand) sound sources (not shown) for stereophonic reproduction of sound.

However, the disposition represented in FIG. 1 is possible only if the screen is made of a material that is permeable to sound waves.

Figure 2:
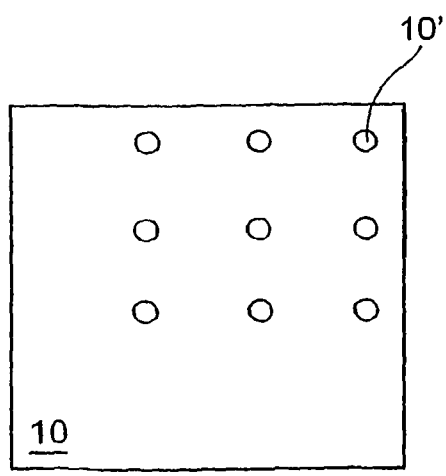
FIG. 2 is an enlarged front view of a prior art screen material.

In a prior art configuration shown diagrammatically in FIG. 2, a material of this kind generally consists of a thin (0.2 to 0.7 mm) sheet of plastics material, generally PVC. This sheet 10 is perforated with a plurality of holes 10' homogeneously distributed over the whole of the surface of the screen at a regular pitch of 8 to 15 mm. The holes 10' have a diameter from 0.8 to 1.5 mm. These holes are provided in the material forming the screen to render it permeable to sound, this permeability to sound not being inherent to the nature of the material. Screens of the above kind are generally encountered in movie theaters.

Although screens of the above kind are generally satisfactory in movie theater installations, this is not the case in domestic video projection installations. Recent developments in video applications, in particular for domestic use, have highlighted the limitations of this kind of screen. In such applications, the spectators are closer to the screen than in a movie theater, the screens themselves being smaller (with a base length from 180 to 320 cm in most cases). Holes of the above order of magnitude therefore become visible at the usual viewing distances (3 to 10 m).

Screens made from perforated plastics materials have been improved by using holes of smaller diameter (typically 0.5 mm) with a smaller spacing (typically 5 mm) to preserve acceptable permeability to sound. Moreover, in an attempt to reduce the undesirable visibility of these holes, it has been proposed to dispose them in a quincunx arrangement. Improved screens of the above type with base dimensions from 2 to 3.5 m offer slightly better video image quality than can be obtained with conventional perforated movie theater screens, but without preventing Moiré phenomena (see below).

What is more, their permeability to sound is still low, and can be improved only to the detriment of image quality (a greater density of perforations in the projection surface reduces the reflecting surface area).

The development of fixed pixel video projectors, which offer many advantages over earlier scanning type projectors, has given rise to a problem of compatibility with perforated screens.

Fixed pixel projectors have a particular number of pixels, disposed in a matrix made up of rows and columns. The divisions between the rows and columns of pixels are monochrome areas of constant value, and therefore form visible lines projected onto the screen.

These lines form an orthogonal grid along the rows and columns of the matrix of pixels, which is not particularly troublesome in itself if the viewing distance is sufficient (a viewing distance is generally considered to be sufficient if the dimension of a projected pixel is less than or equal to the limit of visibility, which is from 1 to 5 minutes of arc, depending on the person).

Superposition of the projected grid and the array formed by holes in perforated canvas, disposed in regular horizontal and vertical alignments, creates a form of optical interference known as the Moiré effect, producing lines both wider and farther apart than the pitch of the projected grids or of the alignments of holes. These Moiré effects are highly visible and constitute unwanted picture artefacts.

Moreover, if the plane defined by the projection surface is not exactly perpendicular to the projection axis, or if its flatness is imperfect, the visible Moiré lines are no longer parallel to the lines of the grids that produce them, which makes them even more visible.

What is more, when projecting moving video images, alternating darks scenes, masking the projected grid, and light scenes, makes the Moiré effect intermittent and therefore even more visible, as there is no accommodation.

This phenomenon has led many screen users to conclude that perforated screens are not readily compatible with fixed pixel projectors.

Figure 3:
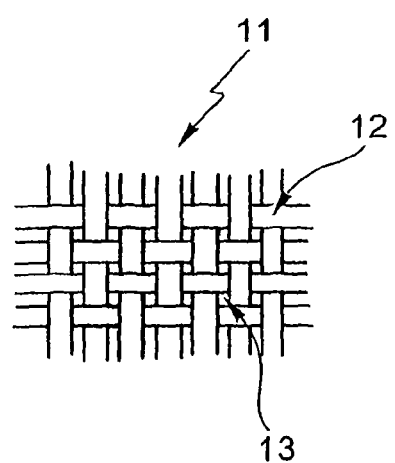
FIG. 3 is a front view of a conventional canvas type woven material.

FIG. 3 is a diagram representing a woven screen 11 offering good permeability to sound, but generally to the detriment of video image reproduction quality. The weft threads 12 are sufficiently spaced to produce interstitial passages 13 offering good permeability to sound. Woven screens of this type have a visible grid appearance, liable to interfere optically with the grids projected by fixed pixel video projectors. Note that the weave is very simple, limited to the crossing of individual threads in two perpendicular directions; this particularly simple type of weave is often referred to as "canvas". The threads have a diameter of 0.5 mm, for example.

The subsequent figures correspond to various ways of arranging textile or plastics materials threads that are knitted, woven, non-woven or assembled in any other manner, that, in accordance with the invention, significantly reduce Moiré effects.

These arrangements have the common feature of a sheet having a projection face and a plurality of passages adapted to allow sound waves to pass through the sheet, the disposition of the plurality of passages being such that, if alignments can be detected therein, at least the main alignments have a non-zero inclination with respect to the edges of the screen. Moreover, several of the plurality of passages have significant geometry or orientation variations.

Figure 4:
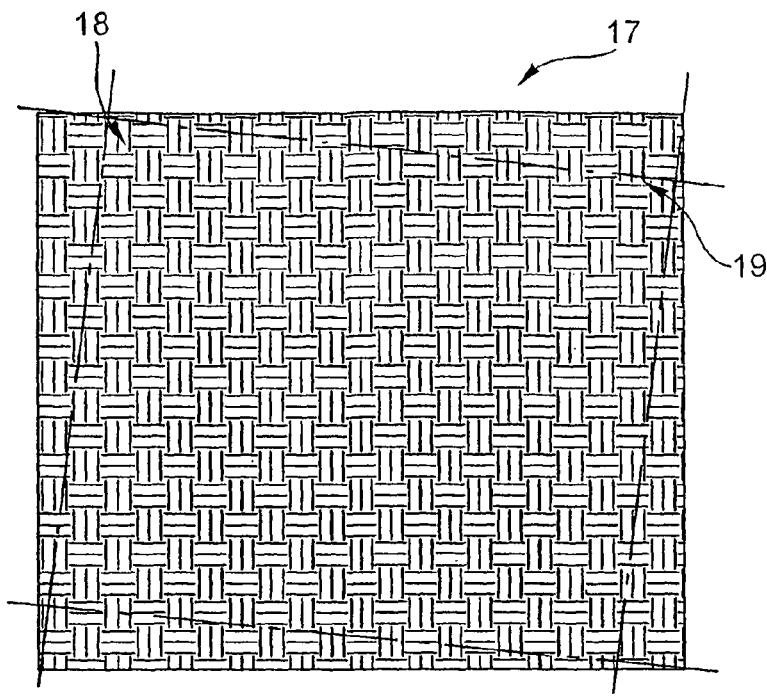
FIG. 4 is a front view of a woven material constituting, after inclination in its plane, a first embodiment of a screen of the invention.

In a first embodiment of the invention, as shown in FIG. 4, the projection screen is made from a woven sheet 17 so that the warp threads 18 and the weft threads 19 appear contiguous when they are viewed in a direction approximately normal to the plane of the screen.

The threads being interleaved in a simple pattern, namely that of canvas, but being paired, there are significant differences of shape or orientation between the various passages, according to whether they are between the two warp threads or not, whilst being situated between the two weft threads or not.

The threads themselves have a diameter from 0.02 to 0.2 mm.

Accordingly, the pitch of a (where applicable visible) array of this kind of woven material is from 10 to 100 times finer than that of the projection of an SXGA matrix (1200×1024 pixels, at present the most usual resolution of projectors for domestic use), projected onto a screen with a base of 2.40 m.

This pitch remains of a very different order of magnitude compared to that of matrices projected by projectors offering higher resolutions that may be envisaged in the near future.

The screen is obtained by inclining the sheet at an angle α by rotation in its plane, so that the warp and weft threads form any non-zero angle to the edges of the screen. This angle α is advantageously from 5 to 25° (see FIG. 9).

To this end, the rectangular piece constituting the screen may be cut out from the woven fabric on the bias, at this bias angle (see the chain-dotted lines in FIG. 4).

This kind of inclination may be applied to any passage structure, even a prior art structure, in order to depart as far as possible from a periodic array of a projected pixel structure the edges whereof are in practice parallel to the main alignments of the array.

In practice, it is found that the projection of a video image onto a screen with a base length from 1.8 to 3 m in accordance with this first embodiment of the invention does not produce any visible Moiré effect with existing projectors.

It may be noted that, because of the geometry of the particular passages of this embodiment, the progress of the sound wave through the woven material occurs, throughout the audible frequency band, by diffraction around the threads, since the latter in practice have a diameter less than the wavelength of the maximum audible frequency (17.15 mm).

Figure 5:
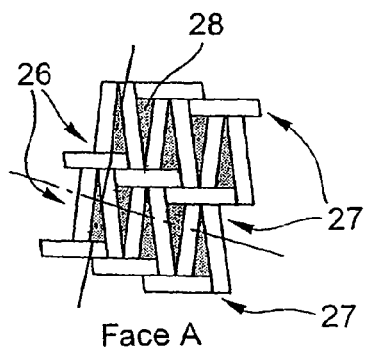
FIG. 5 is a front view of a first face of a woven material constituting a second embodiment of a screen of the invention when illuminated at an angle of about 45° to the normal to the plane of the screen.
Figure 6:
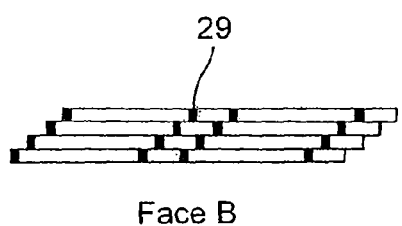
FIG. 6 is a view of the second (rear) face of the same woven material with the same illumination.
Figure 7:
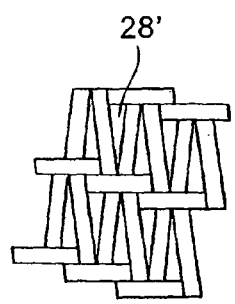
FIG. 7 is a front view of a woven material identical to that of FIG. 5 when illuminated in a direction normal to the plane of the screen and passing through its center.

A second embodiment of a screen of the invention, as represented in FIGS. 5 to 7, uses a projection surface 25 consisting of a satin type woven material, sometimes known as tweed, similar to the weaving mode of denim jeans.

This kind of woven material has two faces of different appearance, a face A being represented in FIG. 5 and a face B in FIG. 6.

Generally speaking, this sheet has a double structure, one a conventional orthogonal warp and weft structure and the other a bias structure, at an angle of the order of 30°, for example.

FIGS. 5 and 6 show the woven fabric when illuminated in a direction globally oblique to the plane of the material. This kind of illumination highlights the relief of the woven material, which overall has oblique rows 26 (FIG. 6A) in the form of grooves, bordered by raised portions 27. The height of the raised portions 27 relative to the grooves 26 is substantially equal to the diameter of the thread.

Through shadowing, oblique illumination accentuates the interstices 28 between the threads, which do not correspond to the interstices 29 visible on the face B of the woven material.

FIG. 7 shows the face A of the woven material used in this embodiment of the invention when illuminated in a direction substantially normal to the plane of the woven material. Under this illumination, which corresponds to that produced by a video projector in use, the passages 28' between the threads are not (or not very) apparent, because of their different positions on faces A and B.

It follows from the above that, independently of the inclination of the individual threads, the passages intended for the sound waves to pass through the sheet have alignments that are inclined with respect to the edges (see the chain-dotted lines). These passages advantageously also have an orientation and a geometry that vary across the sheet and from one passage to an adjacent passage.

Thus the woven material is practically opaque to light and, in video projection, has no structure parallel to the edges that is clearly visible and liable to interfere optically to an unacceptable degree with a grid projected onto the screen.

Apart from the favorable effect of inclining the alignments of passages that may be detected, one advantage of this embodiment is that it achieves at least approximate concealment of the passages 28' between the threads, nevertheless enabling the latter to have a dimension sufficient to optimize the permeability of the screen 25 to air and therefore to sound waves.

The thread selected is preferably polyvinyl chloride with a fibrous core, for example a glass fiber, carbon fiber or kevlar fiber core, although this is not limiting on the invention.

The diameter of the thread is preferably from 0.1 mm to 0.17 mm, although this is also not limiting on the invention.

The distances between the threads preferably do not exceed 0.3 mm.

As in the preceding embodiment, the sheet is advantageously rotated in its plane so that the warp and weft threads are at any non-zero angle to the edges of the screen.

Figure 8:
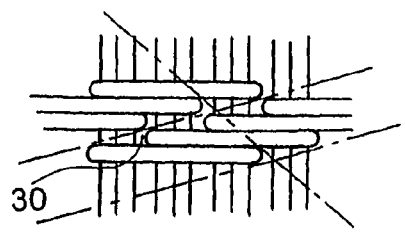
FIG. 8 is a front view of a woven material constituting a third embodiment of a screen of the invention.

FIG. 8 is a diagram showing another embodiment with, on the front face of the woven material concerned, individual weft threads that are interleaved with pairs of warp threads (each time passing in front of three such pairs, with an offset of one pair on passing from one weft thread to the next). The rear face of this kind of woven material is analogous to that represented in FIG. 7, i.e. the pairs of warp threads are doubled up on the rear face.

This type of weave also features passages 30 disposed in an array, but with a significant inclination of the rows of passages to the edges (see the chain-dotted lines).

Accordingly, even if it cannot really be said that the passages are not visible, any alignments that may be detected have significant inclinations to the edges, thanks to which there is a significant reduction in the risk of formation of Moiré patterns.

Another embodiment of the screen uses a crepe or pique type woven material, preferably knitted, woven or non-woven.

A crepe or pique woven material knitted from bouclé thread with a diameter from 0.02 mm to 0.1 mm is preferably selected.

A synthetic, polyester or acrylic thread is preferably selected.

Although obtained with a weave that may be very simple, a woven material of the above kind, because of the crepe and/or bouclé nature of the thread that produce an interleaving effect in the passages, has the particular feature of offering no visible periodic structure, and therefore no alignment of passages that is readily detectable. Whatever the size of the image and the resolution of the projector, no optical interference occurs when a grid of pixels is projected.

A woven material generally has a resistance to penetration of air related to its density. Reducing its density improves its permeability to air, and therefore to sound waves, but reduces its opacity to light, which degrades the projected image reproduction quality.

It has been found that a screen of woven material of the crepe or pique type offers optimum opacity and optimum permeability to air for a density from 150 to 220 g/m$^2$.

Another embodiment of the invention creates passages in a solid sheet in the form of slots formed on the bias relative to the plane of the sheet, so that in the plane of the sheet they are not seen as perforations.

Figure 9:
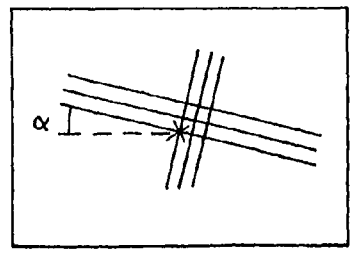
FIG. 9 is a diagram indicating a preferred orientation relative to the edges of the screen of a material like those of FIGS. 2, 3 and 4.

It follows from the foregoing that a screen of the invention may be produced by pivoting in its plane a sheet having any structure made up of passages so that the structure is inclined to the edges of the screen, preferably at an angle from 5 to 25° (see FIG. 9).

Figure 10:
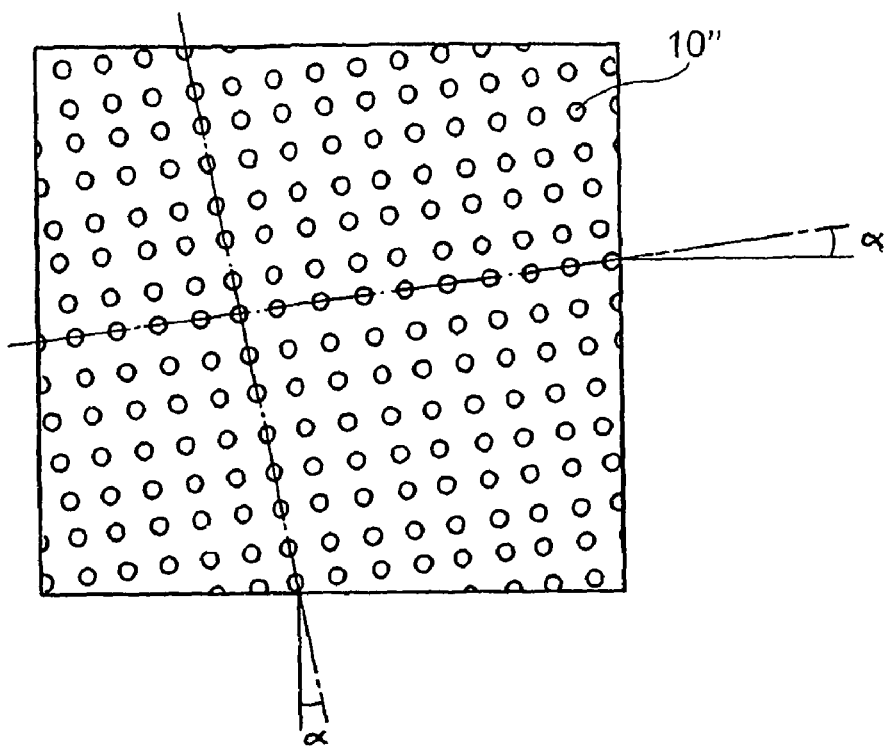
FIG. 10 is a diagram of a perforated screen indicating a preferred orientation of the alignments of perforations relative to the edges of the screen.

Thus FIG. 10 represents a screen whose edges have been cut on the bias from a sheet of the FIG. 2 kind; it is easy to identify therein the square mesh array from FIG. 2 (the passages 10" correspond to the passages 10' in FIG. 2).

Figure 11:
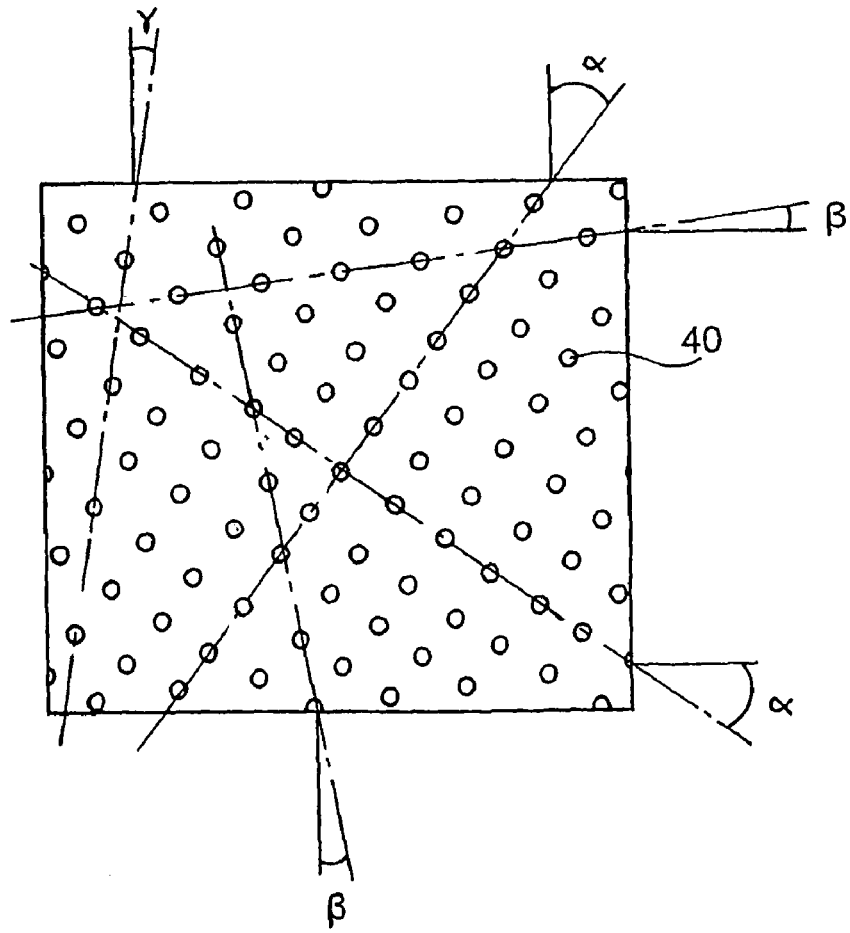
FIG. 11 is a diagram of a more complex (quincunx arrangement) perforated screen, indicating multiple alignments relative to the edges of the screen.

FIG. 11 shows an array of passages 40 that may be defined in various ways. Considering the two orientations inclined at the angle α to the horizontal and vertical edges of the screen, a square mesh array is seen. On the other hand, considering the two orientations inclined at the angle β to the same horizontal and vertical edges of the screen, a quincunx array is seen. Finally, if an inclination direction a relative to one side of the screen is considered in combination with an inclination direction β relative to another side of that screen, a non-rectangular parallelepiped mesh network is seen. Furthermore, many other alignments may be identified, such as that characterized by an inclination γ. According to the invention, at least the main alignments, and thus those which are the most dense, have a non-zero inclination relative to the edges of the screen.

In addition to a sheet of one of the types described above, the screen may have a second layer substantially superimposed on the first, permeable to sound waves and placed behind said first layer relative to the light flux from the projector.

In all the embodiments of the present invention described, the woven material used to constitute a screen projection surface is preferably white. However, in certain applications, the use of pale grey woven materials may be envisaged, or materials having some other color close to white, or even different.

The invention claimed is:

1. Fixed pixel video projection installation comprising a projection screen and a sound source disposed behind said screen, said screen including a sheet having a projection face and provided with at least three passages configured to allow sound waves emitted by the sound source to pass through said sheet, wherein the disposition of the passages of said at least three passages is such that the most dense alignments thereof that can be detected have a non-zero inclination relative to the vertical and horizontal edges of the screen so as to minimize the risk of coincidence between the vertical and horizontal alignments of the projected image pixel structures and the projection screen passage structure.

2. Video projection installation according to claim 1, further comprising a projector with fixed pixels that is arranged in front of this screen.

3. Video projection installation according to claim 1, wherein the screen has a base of between 1.80 m and 3 m.

4. Video projection installation according to claim 1, wherein the at least three passages has substantial geometry or orientation variations.

5. Video projection installation according to claim 1, wherein said sheet is perforated.

6. Video projection installation according to claim 5, wherein the perforated sheet comprises perforation holes having a diameter of 0.5 mm.

7. Video projection installation according to claim 1, wherein said sheet is woven.

8. Video projection installation according to claim 7, wherein the woven sheet comprises weft threads and warp threads each have a diameter of between 0.02 mm and 0.2 mm.

9. Video projection installation according to claim 7, wherein the woven sheet comprises warp threads and weft threads that are interleaved in pairs.

10. Video projection installation according to claim 7, wherein said sheet is a weave of a different number of warp threads and of weft threads, thus forming inclined alignments of passages.

11. Video projection installation according to claim 7, wherein the woven sheet comprises warp threads, weft threads and ribs on the projection face inclined relative to the general directions of the warp and weft threads.

12. Video projection installation according to claim 7, wherein the woven sheet comprises weft threads and warp threads that form a non-zero angle with respect to the edges of the screen.

13. Video projection installation according to claim 12, wherein the angle is between 5° and 25°.

14. Video projection installation according to claim 7, wherein the woven sheet comprises threads having a diameter between 0.1 mm and 1.7 mm.

15. Video projection installation according to claim 7, wherein the woven sheet comprises threads and spacing between the threads does not exceed 0.3 mm.

16. Video projection installation according to claim 7, wherein weaving utilizes threads coated with polyvinyl chloride.

17. Video projection installation according to claim 1, wherein said sheet is of knitted thread.

18. Video projection installation according to claim 1, wherein the thread is a boucleé thread.

19. Video projection installation according to claim 18, wherein the thread diameter is between 0.02 mm and 0.1 mm.

20. Video projection installation according to claim 18, wherein the thread is a polyester thread.

21. Video projection installation according to claim 1, wherein no weft threads are apparent.

22. Video projection installation according to claim 1, wherein said surface is a crepe or pique woven material surface.

23. Video projection installation according to claim 22, wherein said woven has a density of between 150 and 220 $g/m^2$.

24. Video projection installation according to claim 1, wherein the sheet is a woven sheet of the satin type.

25. Video projection installation according to claim 1, wherein the sheet is a woven sheet of the tweed type.

26. Video projection installation according to claim 1, further comprising a second sheet that is permeable to sound waves, substantially superposed on the first sheet and placed behind said first sheet relative to light projected from the projector.

27. Fixed pixel video projection installation comprising a projection screen and a sound source disposed behind said screen, said screen consisting of a perforated sheet having a projection face and provided with at least three passages configured to allow sound waves emitted by the sound source to pass through said sheet, wherein the disposition of the passages of said at least three passages is such that the most dense alignments thereof that can be detected have a non-zero inclination relative to the vertical and horizontal edges of the screen so as to minimize the risk of coincidence between the vertical and horizontal alignments of the projected image pixel structures and the projection screen passage structure.

28. Fixed pixel video projection installation comprising a projection screen and a sound source disposed behind said screen, said screen including a sheet having a projection face and provided with at least three passages configured to allow sound waves emitted by the sound source to pass through said sheet, wherein the disposition of the at least three passages is such that the most dense alignments thereof that can be detected have a non-zero inclination relative to the vertical and horizontal edges of the screen so as to minimize the risk of coincidence between the vertical and horizontal alignments of the projected image pixel structures and the projection screen passage structure, and further comprising a second sheet that is permeable to sound waves, substantially superposed on the first sheet and placed behind said first sheet relative to light projected from the projector.

29. Fixed pixel video projection installation comprising a projection screen and a sound source disposed behind said screen, said screen consisting of a woven sheet having a projection face and provided with at least three passages configured to allow sound waves emitted by the sound source to pass through said sheet, wherein the disposition of the at least three passages is such that the most dense alignments thereof that can be detected have a non-zero inclination relative to the vertical and horizontal edges of the screen so as to minimize the risk of coincidence between the vertical and horizontal alignments of the projected image pixel structures and the projection screen passage structure.

30. The fixed video projection installation according to claim 29, wherein the woven sheet comprises threads having a diameter between 0.1 mm and 2 mm.

31. The fixed video projection installation according to claim 29, wherein the woven sheet comprises warp threads and weft threads of substantially equal diameters.

* * * * *